(12) United States Patent
Won et al.

(10) Patent No.: US 8,451,188 B2
(45) Date of Patent: May 28, 2013

(54) DATA SENDING AND RECEIVING TERMINAL

(75) Inventors: Dongsu Won, Seoul (KR); Kyung Ho Chung, Seoul (KR); Ji Hun Leem, Seoul (KR); Yong-Sang Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 464 days.

(21) Appl. No.: 12/779,908

(22) Filed: May 13, 2010

(65) Prior Publication Data

US 2011/0080326 A1 Apr. 7, 2011

(30) Foreign Application Priority Data

Oct. 6, 2009 (KR) ........................ 10-2009-0094610

(51) Int. Cl.
*H01Q 1/50* (2006.01)

(52) U.S. Cl.
USPC .......................................... 343/906; 343/702

(58) Field of Classification Search
USPC ................................... 343/702, 906; 439/916
See application file for complete search history.

(56) References Cited

U.S. PATENT DOCUMENTS

| 6,758,689 | B1 * | 7/2004 | Bair et al. | 439/136 |
| 8,274,447 | B2 * | 9/2012 | Zhang et al. | 343/906 |
| 2008/0068271 | A1 * | 3/2008 | Iwai et al. | 343/702 |
| 2008/0278405 | A1 * | 11/2008 | Montgomery et al. | 343/893 |
| 2009/0096681 | A1 * | 4/2009 | Hunt et al. | 343/702 |

FOREIGN PATENT DOCUMENTS

| JP | 2005123728 | 5/2005 |
| JP | 2006067254 | 3/2006 |
| JP | 2009070005 | 4/2009 |
| JP | 2009151435 | 7/2009 |
| WO | 2009088415 | 7/2009 |

* cited by examiner

*Primary Examiner* — Hoanganh Le
(74) *Attorney, Agent, or Firm* — Lee, Hong, Degerman, Kang & Waimey

(57) ABSTRACT

According to one embodiment, a data sending and receiving terminal includes a first body, a second body connected to the first body, the second body forming an opening and closing mechanism for the first body, a plurality of first antennas embedded in the first body, and a plurality of second antennas embedded in the second body. According to another embodiment, a method of configuring a data sending and receiving terminal having a first body and a second body is disclosed. The method includes: embedding a plurality of first antennas in the first body; embedding a plurality of second antennas in the second body; and coupling the first body and the second body such that the second body has an open state and a closed state relative to the first body.

10 Claims, 8 Drawing Sheets

DATA SENDING AND RECEIVING TERMINAL

Pursuant to 35 U.S.C. §119(a), this application claims the benefit of earlier filing date and right of priority to Korean Application No. 10-2009-0094610, filed on Oct. 6, 2009, the contents of which are hereby incorporated by reference herein in its entirety.

BACKGROUND

1. Field

Embodiments of the present invention generally relate to a data sending and receiving terminal and, in particular, to a data sending and receiving terminal which is connected to external information terminals through a wired/wireless interface and sends and receives data by using multi-input multi-output technology.

2. Discussion of the Related Art

Mobile communication technology is evolving to the 4th generation mobile communications. A core technology of the 4th generation mobile communication technology is multi-input multi-output (MIMO) technology. MIMO technology utilizes a multiple antenna signal processing scheme which sends and receives data by using multiple antennas in a mobile environment.

By sending and receiving data simultaneously through a plurality of antennas, MIMO technology implements broadband wireless data communication and significantly enhances data sending and receiving speed, thereby increasing data transfer rate. Based on MIMO technology, if signals are transmitted through N antennas arranged in the sending side along with N antennas arranged in the receiver side, an N times increase in transfer rate can be obtained.

In particular, if MIMO technology is used together with OFDM (Orthogonal Frequency Division Multiplexing), which has been incorporated into LTE (Long Term Evolution) technology representing the 4th generation mobile communication technology, high speed data transmission and high data capacity can be obtained, by which a communication environment optimized for multimedia services can be realized. OFDM technology, which employs a scheme that assigns data into multiple frequency and time ranges, can divide a single channel into several sub-channels; by allowing overlap between the sub-channels, bandwidth is saved and frequency interference can be minimized as the frequency band is divided into hundreds of sub-bands.

Demand for small sized (or smaller-sized) devices for sending and receiving data is rapidly growing, where the device is attached to an information terminal, such as a computer or a mobile phone, and relays data between the information terminal and a mobile communication network or between the information terminal and a wireless Internet network. However, MIMO technology requires multiple antennas and cannot be easily applied to a small sized device for sending and receiving data because of a coupling problem among the antennas and limited dimensions (or capacity) for installing multiple antennas.

Recently, a new LTE frequency band lower than the pre-existing 700 MHz frequency band of 3GPP bands 12, 13, and 17 has been assigned. Accordingly, the ground plane of an antenna, namely, the size of a printed circuit board (PCB), should be enlarged. Due to the limited dimensions of a small sized terminal, however, it is not easy to design an antenna ground plane appropriate for the new LTE frequency band.

SUMMARY

Embodiments of the present invention are described with reference to a data sending and receiving terminal, where the terminal is portable and employs multi-input and multi-output technology.

According to one embodiment, a data sending and receiving terminal includes a first body, a second body connected to the first body, the second body forming an opening and closing mechanism for the first body, a plurality of first antennas embedded in the first body, and a plurality of second antennas embedded in the second body.

According to another embodiment, a method of configuring a data sending and receiving terminal having a first body and a second body is disclosed. The method includes: embedding a plurality of first antennas in the first body; embedding a plurality of second antennas in the second body; and coupling the first body and the second body such that the second body has an open state and a closed state relative to the first body.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A mobile terminal according to various embodiments will be described in more detail with reference to the accompanying drawings. The use herein of a suffix such as "module" or "unit" is applied merely for ease of description, and the suffix itself does not give any special meaning or function. Therefore, it should be noted that the suffix "module" or "unit" may be interchangeably used relative to each other.

A data sending and receiving device according to various embodiments may include a data card of a USB (Universal Serial Bus) dongle type, a dongle terminal (or a broadband wireless adaptor), an MP3 player, a PMP (Portable Media Player), a mobile phone, a smart phone, a PDA (Personal Digital Assistant), a PMP (Portable Multimedia Player), and/or a navigation terminal.

Figure 1:
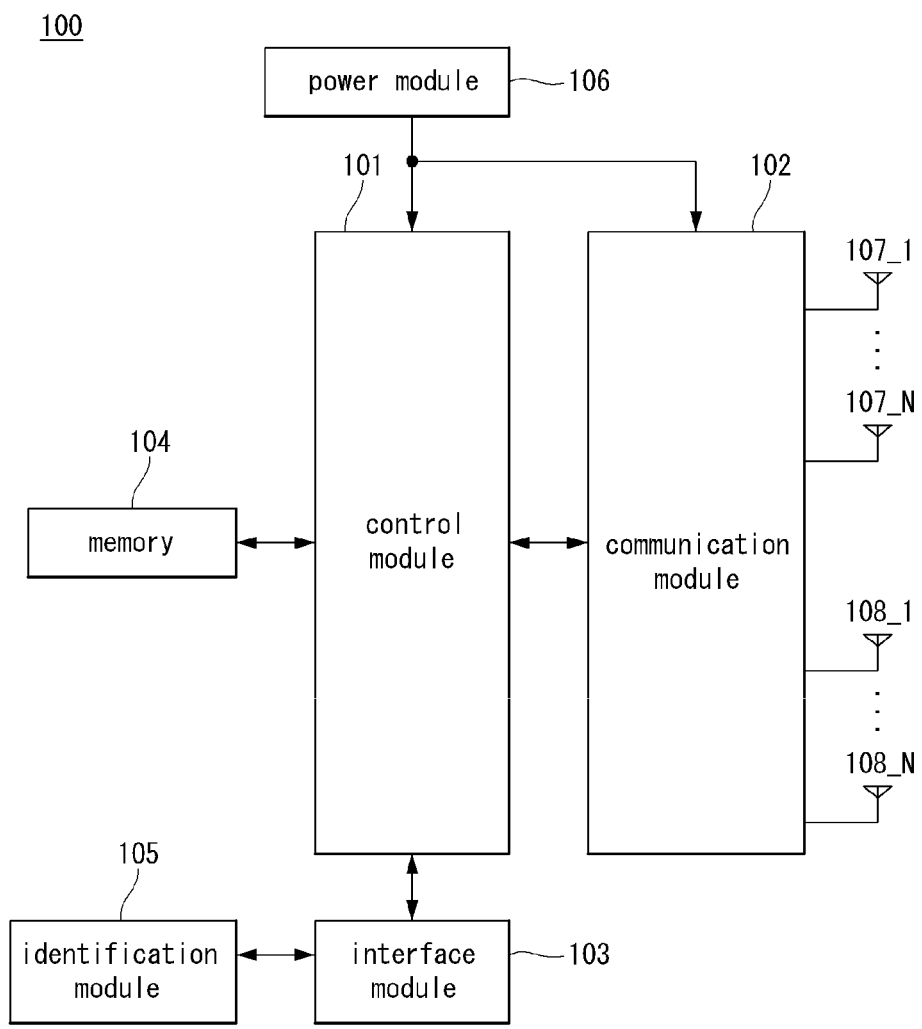
FIG. 1 illustrates a block diagram of a data sending and receiving terminal according to one embodiment.

FIG. 1 illustrates a block diagram of a data sending and receiving terminal according to one embodiment. With reference to FIG. 1, the data sending and receiving terminal 100 includes a control module 101, a communication module 102, an interface module 103, a memory 104, an identification module 105, and a power module 106.

The control module 101 is connected to an external information terminal such as a personal computer or a notebook computer (see, for example, FIG. 7) through the interface module 103 and provides the communication module 102 with data from the information terminal. The control module 101 stores data from the external information terminal into the memory 104, reads out data stored in the memory 104, and provides the data for (or to) the communication module 102. Also, the control module 101 checks data received from the communication module 102 for errors, transforms the checked data into a signal complying with specifications requested by the external information terminal, and transfers the signal into the interface module 103.

The communication module 102 may include more than one module which enables wireless communication between the data sending and receiving terminal 100 and a wireless communication system or between the data sending and receiving terminal 100 and a network to which the data sending and receiving terminal 100 belongs. For example, the communication module 102 may include a mobile communication module, a broadcasting receiver module, a wireless Internet module, a short range communication module, and/or a location information module. These communication modules can be adjusted selectively by a manufacturer.

According to one embodiment, the communication module 102 modulates data received from the control module 101 according to mobile communication specifications, transmits the modulated data to base stations of a mobile communication network through more than one primary antenna (e.g., primary antenna 107_1, . . . , primary antenna 107_N, where N is a positive integer) and more than one diversity antenna (e.g., diversity antenna 108_1, . . . , diversity antenna 108_N), demodulates data received from the base stations of the mobile communication network, and provides the demodulated data to the control module 101.

The mobile communication specifications may include CDMA (Code Division Multiple Access), WCDMA (Wideband CDMA), HSPA (High Speed Packet Access), CDMA2000, HRPD (High Rate Packet Data), and/or UMB (Ultra Mobile Broadband). The mobile communication specifications may further include those of the 4th generation mobile communication network, for example, 3GPP LTE (Long Term Evolution) specifications, and 3GPP2 UMB (Ultra Mobile Broadband) specifications.

The primary antennas 107_1, . . . , 107_N may include a PCS (Personal Communication Service) primary antenna which sends and receives signals at a PCS frequency, a CDMA/DCN (Digital Cellular Network)/WCDMA primary antenna which sends and receives signals at a CDMA/DCN/WCDMA frequency, a GSM (Global System for Mobile communication) primary antenna which sends and receives signals at a GSM frequency, an LTE/UMB primary antenna which sends and receives signals at an LTE/UMB frequency, and a combination thereof (e.g., a combination totaling two or more of the above-noted antennas). The diversity antennas 108_1, . . . , 108_N may include a diversity antenna for e-HRPD which receives signals at a PCS frequency, a diversity antenna for HSDPA (High-Speed Downlink Packet Access)/HSUPA (High-Speed Uplink Packet Access)/HSPA which receives signals at a WCDMA frequency, a diversity antenna for LTE which receives signals at an LTE frequency, and a combination thereof (e.g., a combination totaling two or more of the above-noted antennas).

Each antenna can additionally utilize a GPS (Global Positioning System) antenna for multi-module implementation. The data sending and receiving terminal 100 may further include a broadcasting receiving antenna and a short range communication antenna as well as primary antennas 107_1, . . . , 107_N and diversity antennas 108_1, . . . , 108_N.

A broadcasting receiving module, which that may be included in the communication module 102, receives broadcasting signals and/or broadcasting-related information from an external broadcasting management server through a broadcasting receiving antenna. Such signals and information may be received over a broadcasting channel that may include a satellite channel and/or a terrestrial channel. A broadcasting receiving module may receive digital broadcasting signals from a digital broadcasting system such as DMB-T (Digital Multimedia Broadcasting-Terrestrial), DMB-S (Digital Multimedia Broadcasting-Satellite), Media-FLO (Media Forward Link Only), DVB-H (Digital Video Broadcast-Handheld), and ISDB-T (Integrated Services Digital Broadcast-Terrestrial).

The broadcasting management server may be either a server which generates and transmits broadcasting signals and/or broadcasting-related information or a server which receives previously generated broadcasting signals and/or broadcasting-related information and provides them to terminals. In addition to TV broadcasting signals, radio broadcasting signals, and data broadcasting signals, the broadcasting signals may further include broadcasting signals including data broadcasting signals combined with TV broadcasting signals or radio broadcasting signals.

Broadcasting-related information may be information about broadcasting channels, broadcasting programs, or broadcasting service providers. Broadcasting-related information may be provided through a mobile communication network with broadcasting-related information received by the communication module 102. Broadcasting-related information can be produced in the form of an EPG (Electronic Program Guide) of a DMB (Digital Multimedia Broadcasting) system or an ESG (Electronic Service Guide) of a DVB-H (Digital Video Broadcast-Handheld) system.

A wireless Internet module, which may be included in the communication module 102, is connected to a wireless Internet network through WLAN (Wireless LAN), Wi-Fi, Wibro (Wireless broadband), Wimax (World Interoperability for Microwave Access), or HSDPA (High Speed Downlink Packet Access). A short range communication module, which may be included in the communication module 102, sends and receives data based on short range communication specifications of Bluetooth™, RFID (Radio Frequency Identification), IrDA (Infrared Data Association), UWB (Ultra Wideband), or ZigBee™. A location information module, which may be included in the communication module 102, may be implemented by a GPS module.

According to one embodiment, the interface module 103 receives data or power from the external information terminal and provides the data or power to individual circuit modules inside the data sending and receiving terminal 100; the interface module 103 also transmits data from the control module 101 to the external information terminal. The interface module 103 controls a wired/wireless connection of the interface module 103 and the external information terminal as well as an interface controller.

An interface controller includes a wired interface controller and/or a wireless interface controller. For example, an interface controller may include at least one of a USB (Universal Serial Bus) controller, a UART (Universal Asynchronous Receiver and Transceiver) controller, a PCMCIA (Personal Computer Memory Card International Association) controller, and an RS232 controller.

The interface module 103 may include a wired/wireless data interface, a memory card port, and an identification module card port. The wired/wireless data interface may include a USB port, a UART port, a PCMCIA port, and an RS232 port. The USB port may include a USB connector.

An identification module may be inserted into the identification module card port of the interface module 103 in a removable manner and thus can be connected to the data sending and receiving terminal 100. When the data sending and receiving terminal 100 is connected to the external information terminal through a wired/wireless data interface and a request for authentication related to electronic commerce or electronic banking is received from the external information terminal, the control module 101 reads out information stored in the identification module 105 and transfers the data to the external information terminal.

The identification module may include a user identity module (UIM), a subscriber identity module (SIM), and a universal subscriber identity module (USIM). The identification module may be manufactured in the form of a smart card and store information such as a phone number, telephone call information, and billing information.

The power module 106 provides power for circuit modules which require power inside the data sending and receiving terminal 100. In embodiments where power may be provided by the external information terminal through the interface module 103, the power module 106 may or may not be required.

Figure 2:
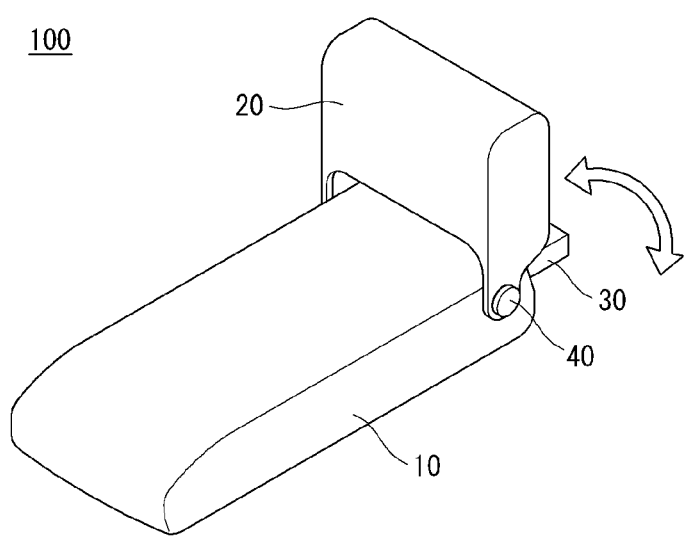
FIGS. 2 and 3 illustrate perspective views of a data sending and receiving terminal according to one embodiment.
Figure 3:
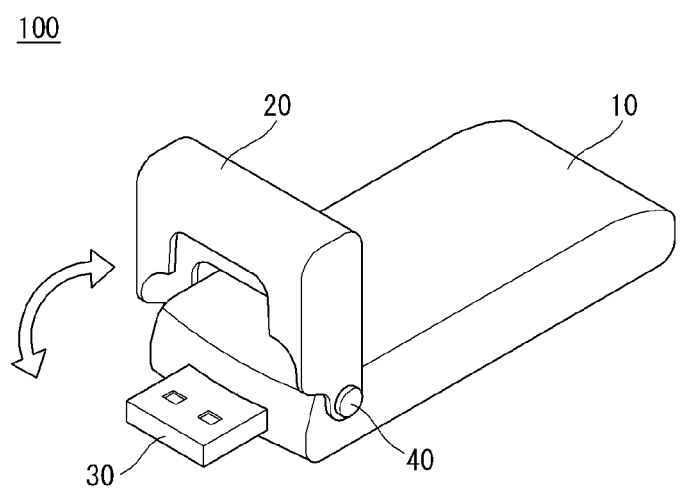

FIGS. 2 and 3 illustrate perspective views (from different directions) of an exterior of a data sending and receiving terminal 100 according to one embodiment. The exterior of the terminal 100 is not limited to that shown in FIGS. 2 and 3, and it should be understood that the exterior can be modified in various ways.

With reference to FIGS. 2 and 3, the data sending and receiving terminal 100 includes a first body 10 and a second body 20, which are joined together via a hinge 40. The first body 10 and the second body 10 are rotatably joined via the hinge 40. A USB connector 30 is formed in the first body 10.

The first body 10 includes a case (e.g., a casing, housing, or cover) on which an exterior image may be displayed. The first body 10 may be divided into a front case (or front casing) and a rear case (or rear casing). According to one embodiment, various electronic components for realizing circuit blocks of FIG. 1 are installed in an inner volume formed between the front case and the rear case of the first body 10. More than one primary antenna (e.g., primary antennas 107_1, 107_N of FIG. 1) and more than one diversity antenna (e.g., diversity antennas 108_1, 108_N of FIG. 1) are embedded in the first body 10.

The second body 20 can be divided into a front case (or front casing) and a rear case (or rear casing). An inner volume formed between the front case and the rear case of the second body 20 incorporates more than one primary antenna (e.g., primary antenna 107_1 of FIG. 1) and more than one diversity antenna (e.g., diversity antenna 108_1 of FIG. 1). The second body 20 can be operated to cover and uncover the USB connector 30 via the hinge 40. An identification module 105 card can be connected to the second body 20 in a removable manner.

The cases of the first and the second body 10, 20 can be manufactured by injection molding of synthetic resin or manufactured to have metallic material such as steel use stainless (SUS) (or stainless steel) or titanium (Ti).

The USB connector 30 protrudes from the first body 10. The data sending and receiving terminal 100 may perform data communication with an external information terminal through the USB connector 30 which is connected to a USB interface of the external information terminal. If the data sending and receiving terminal 100 and the external information terminal utilize a wireless interface, a wireless interface means can be installed in the first body 10 instead of (or in addition to) the USB connector 30.

Figure 4A:
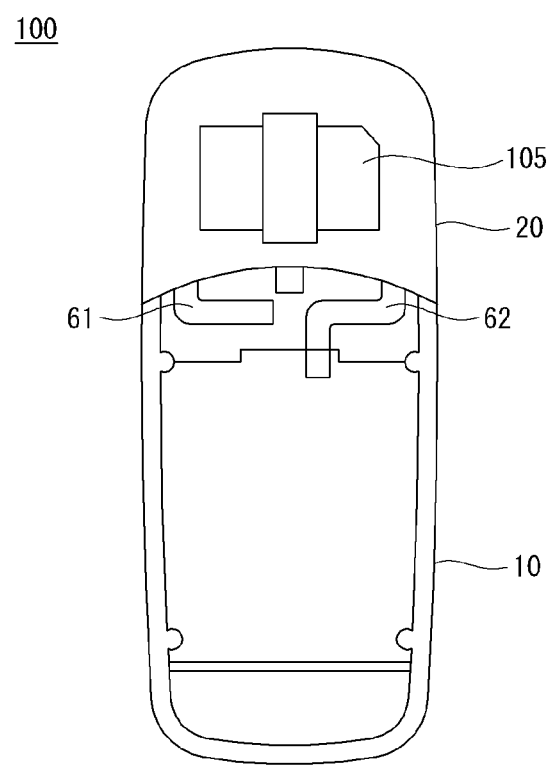
FIG. 4A illustrates a front view of internal portions of a data sending and receiving terminal according to one embodiment.
Figure 4B:
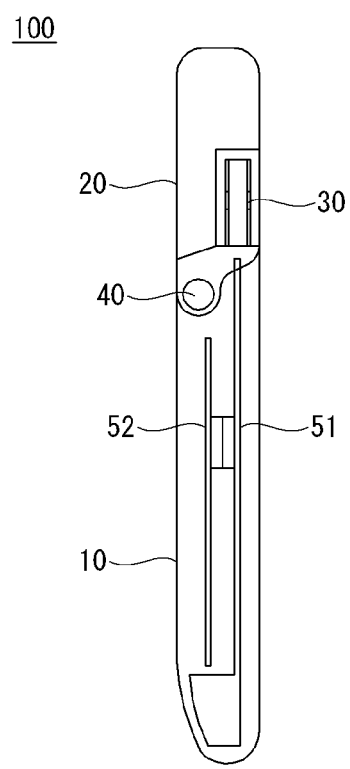
FIG. 4B illustrates a side view of internal portions of the data sending and receiving terminal of FIG. 4A.
Figure 4C:
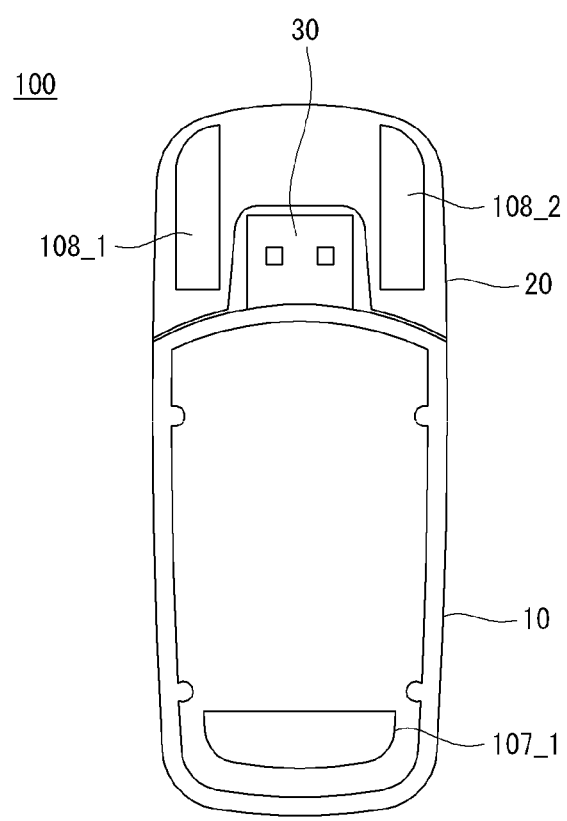
FIG. 4C illustrates a rear view of internal portions of the data sending and receiving terminal of FIG. 4A.

FIGS. 4A to 4C show internal portions of a data sending and receiving terminal 100 according to one embodiment. FIG. 4A illustrates a front view of internal portions of the terminal 100, FIG. 4B illustrates a side view of internal portions of the terminal, and FIG. 4C illustrates a rear view of internal portions of the terminal.

With reference to FIGS. 4A to 4C, more than one printed circuit board (PCB) 51, 52 are embedded in a first body 10, and more than one primary antenna (e.g., primary antennas 107_1, 107_N of FIG. 1) and more than one diversity antenna (e.g., diversity antennas 108_1, 108_N of FIG. 1) are installed in one of the printed circuit boards 51, 52. Antennas embedded in the first body 10 may be realized by broadband monopole antennas operational at 700 Mhz/850 Mhz/1900 Mhz.

According to one embodiment, most of the circuit blocks illustrated in FIG. 1 are mounted in the printed circuit boards 51, 52. For example, the control module 101, the communication module 102, the interface module 103, the memory 104, and the power module 106 may be mounted in the printed circuit boards 51, 52. If the printed circuit board 51, 52 is divided into more than two parts, the printed circuit boards 51, 52 may be connected electrically through a flexible PCB (FPCB) connector.

According to one embodiment, more than one primary antenna (e.g., primary antennas 107_1, 107_N) and more than one diversity antenna (e.g., diversity antennas 108_1, 108_N) are embedded in the second body 20, and an identification module card port, through which an identification module 105 card is inserted in a removable manner, is installed in the second body 20. Each antenna embedded in the second body 20 may be a chip antenna or a monopole antenna operational at 700 Mhz/850 Mhz/1900 Mhz.

Also, with reference to FIG. 4A, FPCBs 61, 62 connect the antennas of the second body 20 and the identification module 105 card electrically to the PCBs 51, 52 of the first body 10. The FPCBs 61, 62 are embedded in the second body 20.

Antennas embedded in the second body 20, which are connected to the first body 10 through FPCBs 61, 62 or a coaxial cable (not shown), may obtain power from the first body 10. To facilitate the antenna embedded in the second body 20 obtaining power from the first body 10 through the FPCB or a coaxial cable, a ground plane of the antennas embedded in the first body 10 and a ground plane of the antennas embedded in the second body 20 are separated from each other, thereby improving isolation between the antennas.

Figure 5:
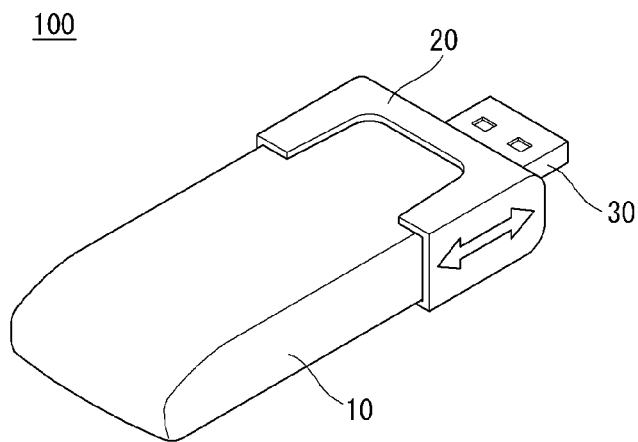
FIG. 5 illustrates a connection configuration of a first body and a second body of a data sending and receiving terminal according to one embodiment.
Figure 6:
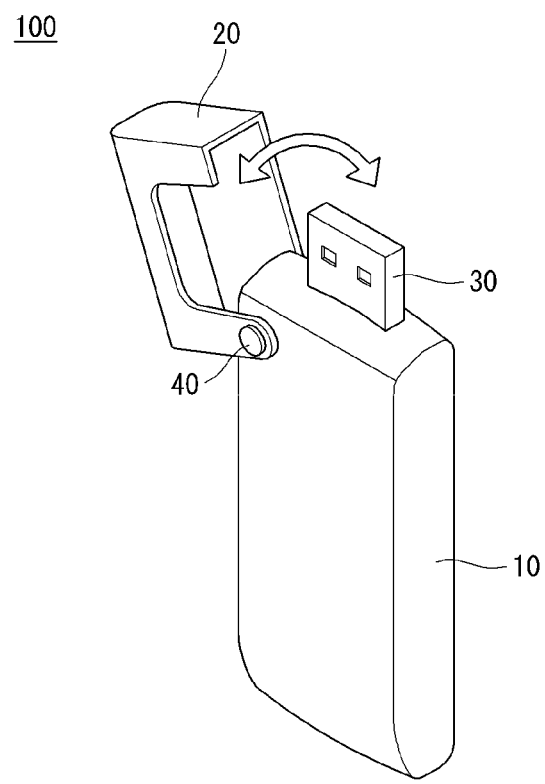
FIG. 6 illustrates a connection configuration of a first body and a second body of a data sending and receiving terminal according to one embodiment.

The second body 20 of the sending and receiving terminal 100 can be connected to the first body 10 to form an opening and closing mechanism for the first body 10 (see, for example, FIGS. 5 and 6). As shown in FIGS. 5 and 6, the second body 20 may be connected to the first body 10 via any of various connection configurations—for example, a slide type, a swivel type, and/or a swing type connector.

Figure 7:
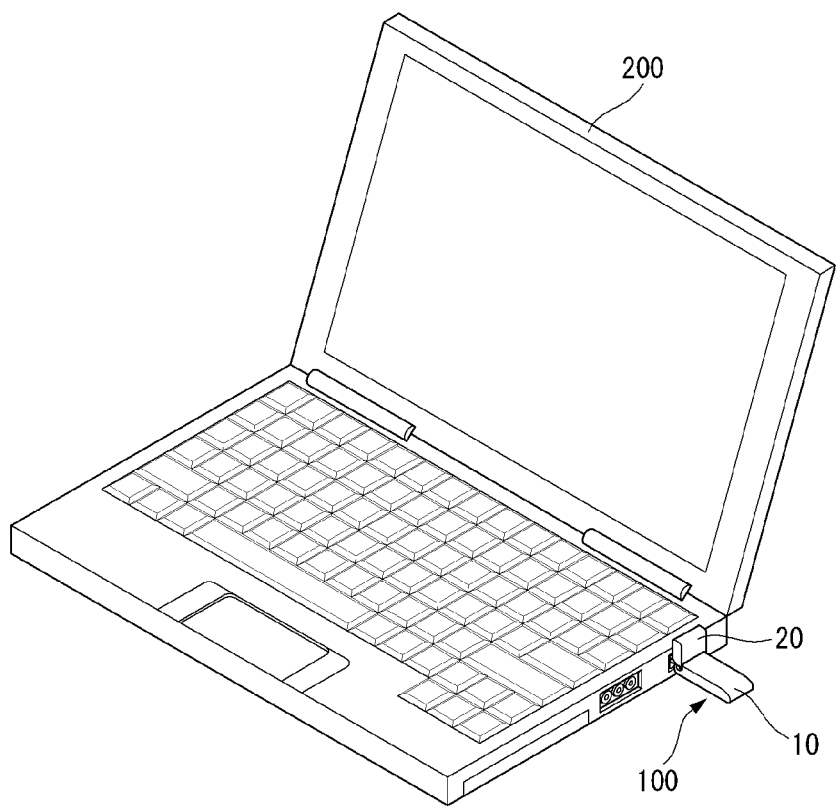
FIG. 7 illustrates a perspective view of an external information terminal to which a data sending and receiving terminal according to one embodiment is connected.

With reference to FIG. 7, the data sending and receiving terminal 100 can be connected to an external information terminal 200 through a USB interface. When the data sending and receiving terminal 100 is connected to the external information terminal 200 according to a particular embodiment, it may be desirable for the second body 20 to rotate around (or about) the first body 10 through the hinge 40 such that an external surface of the second body 20 and an adjacent external surface of the first body 10 form an angle of approximately 90°.

This configuration addresses a mechanical constraint that the second body 20 should be opened 90° from the first body 10 to connect the data sending and receiving terminal 100 to the external information terminal 200 through the USB interface. This configuration also addresses the situation that, when the first body 10 and the second body 20 form a right angle to each other, antennas embedded in the first body 10 and antennas embedded in the second body 20 form an orthogonal arrangement and achieve polarity diversity, thereby providing excellent (or at least more optimal) MIMO quality. If an antenna embedded in the second body 20 includes a patch type chip antenna, isolation among the antennas embedded in the first body 10 and antennas embedded in the second body 20 is improved and, thus, interference among the antennas can be minimized (or at least reduced).

According to various embodiments, the data sending and receiving terminal 100 is manufactured to have a compact size to increase portability. If primary antennas (e.g., primary antennas 107_1, 107_N of FIG. 1) and diversity antennas (e.g., diversity antennas 108_1, 108_N of FIG. 1) are arranged to implement MIMO technology in the compact sized data sending and receiving terminal 100 for sending and receiving data, a coupling effect between the primary and diversity antennas may be generated due to the spatial positioning of the antennas. To minimize (or reduce) this coupling effect between the antennas, an isolation distance between the primary antennas (e.g., primary antennas 107_1, 107_N) and the diversity antennas (e.g., diversity antennas 108_1, 108_N) is increased. For example, with reference to FIG. 4C, diversity antennas 108_1 and 108_2 are embedded in the second body 20, and primary antenna 107_1 is arranged in the first body 10 at an end of the first body opposite to the end of the first body at which the hinge 40 is located.

As described in detail above with reference to various embodiments, by embedding antennas in the first body and embedding antennas in the second body that forms an opening and closing mechanism for the first body, MIMO technology may be implemented. Furthermore, a coupling effect between antennas in a compact sized portable terminal may be reduced.

The foregoing embodiments and advantages are merely exemplary and are not to be construed as limiting the present invention. The present teaching can be readily applied to other types of apparatuses and processes. The description of embodiments of the present invention is intended to be illustrative, and not to limit the scope of the claims. Many alternatives, modifications, and variations will be apparent to those skilled in the art.

What is claimed is:

1. A data sending and receiving terminal comprising:
a first body;
a second body connected to the first body, the second body forming an opening and closing mechanism for the first body;
a hinge rotatably connecting the first body and the second body;
a Universal Serial Bus (USB) connector protruding from the first body;
a plurality of first antennas embedded in the first body;
a plurality of second antennas embedded in the second body; and
a printed circuit board disposed within the first body,
wherein the plurality of second antennas embedded in the second body are connected to the printed circuit board disposed within the first body through a flexible printed circuit board (FPCB) or coaxial cable,
wherein a ground plane of the plurality of the first antennas embedded in the first body and a ground plane of the plurality of second antennas embedded in the second body are separated from each other,
wherein the second body covers and uncovers the USB connector by rotating about the hinge,
wherein the plurality of second antennas comprise a third antenna and a fourth antenna embedded in the second body, and
wherein, when the second body covers the USB connector, a portion of the USB connector is disposed between the third antenna and the fourth antenna along a direction parallel to an axis of rotation of the second body.

2. The terminal of claim 1, further comprising an identification module card port installed in the second body and configured to receive an identification module card comprising a user identity module (UIM), a subscriber identity module (SIM), or a universal subscriber identity module (USIM) and removably insertable into the identification module card port.

3. The terminal of claim 1, wherein the second body uncovers the USB connector such that the second body and the first body form an approximate right angle when the terminal is connected to a USB interface port of an external information terminal.

4. The terminal of claim 1, wherein:
the hinge connects the first body and the second body at a first end of the first body; and
the plurality of first antennas embedded in the first body are positioned at a second end of the first body opposite the first end.

5. The terminal of claim 1, wherein:
the plurality of first antennas embedded in the first body comprise a plurality of first primary antennas and a plurality of first diversity antennas;
the plurality of first primary antennas comprise more than one of a Personal Communication Service (PCS) primary antenna for sending and receiving signals at a PCS frequency, a Code Division Multiple Access (CDMA)/Digital Cellular Network (DCN)/Wideband CDMA (WCDMA) primary antenna for sending and receiving signals at a CDMA/DCN/WCDMA frequency, a Global System for Mobile communication (GSM) primary antenna for sending and receiving signals at a GSM frequency, and an Long Term Evolution (LTE)/Ultra Mobile Broadband (UMB) primary antenna for sending and receiving signals at an LTE/UMB frequency; and
the plurality of first diversity antennas comprise more than one of a diversity antenna for enhanced High Rate Packet Data (e-HRPD) for receiving signals at a DCN/PCS frequency, a diversity antenna for High-Speed Uplink Packet Access (HSDPA)/High-Speed Uplink Packet Access (HSUPA)/High Speed Packet Access (HSPA) for receiving signals at a WCDMA frequency, and a diversity antenna for LTE for receiving signals at an LTE frequency.

6. The terminal of claim 5, wherein:
the plurality of second antennas embedded in the second body further comprise a plurality of second primary antennas and a plurality of second diversity antennas;
the plurality of second primary antennas comprise more than one of a PCS primary antenna for sending and receiving signals at a PCS frequency, a CDMA/DCN/WCDMA primary antenna for sending and receiving signals at a CDMA/DCN/WCDMA frequency, a GSM primary antenna for sending and receiving signals at a GSM frequency, and an LTE/UMB primary antenna for sending and receiving signals at an LTE/UMB frequency; and
the plurality of second diversity antennas comprise more than one of a diversity antenna for e-HRPD for receiving signals at a DCN/PCS frequency, a diversity antenna for HSDPA/HSUPA/HSPA for receiving signals at a WCDMA frequency, and a diversity antenna for LTE for receiving signals at an LTE frequency.

7. The terminal of claim 1, wherein the plurality of first antennas embedded in the first body comprise a broadband monopole antenna operational at 700 Mhz/850 Mhz/1900 Mhz.

8. The terminal of claim 7, wherein the plurality of second antennas embedded in the second body further comprise a chip antenna and a monopole antenna operational at 700 Mhz/850 Mhz/1900 Mhz.

9. The terminal of claim 1, wherein, when the second body covers the USB connector, a first surface of the USB connector is hidden by the second body and a second surface of the USB connector is exposed.

10. The terminal of claim 1, wherein:
a wall of the second body has an opening; and
the USB connector passes through the opening when the second body rotates about the hinge.

* * * * *